United States Patent [19]

Hughes et al.

[11] 3,996,525
[45] Dec. 7, 1976

[54] ACOUSTO-OPTICALLY TUNED LASER

[75] Inventors: Richard Swart Hughes, China Lake, Calif.; Michel Paul Imbert, Longjumeau, France; Thomas F. Nowicki, New Milford, N.J.

[73] Assignee: The United States of America as represented by the Secretary of the Navy, Washington, D.C.

[22] Filed: May 12, 1975

[21] Appl. No.: 576,496

[52] U.S. Cl. .......................................... 331/94.5 C
[51] Int. Cl.² .......................................... H01S 3/10
[58] Field of Search .......... 350/149, 161; 331/94.5; 332/7.51

[56] References Cited

UNITED STATES PATENTS

| 3,644,015 | 2/1972 | Hearn | 350/149 |
|---|---|---|---|
| 3,666,349 | 5/1972 | Hubby, Jr. | 350/149 |
| 3,679,288 | 7/1972 | Harris | 350/149 |
| 3,928,814 | 12/1975 | Feichtner | 331/94.5 M |

Primary Examiner—William L. Sikes
Attorney, Agent, or Firm—R. S. Sciascia; Roy Miller

[57] ABSTRACT

A tunable laser wherein the tuning element is intracavity and comprises a polarizing prism for linearly polarizing the beam, and an electronically tunable filter backed by a retroreflective surface.

2 Claims, 1 Drawing Figure

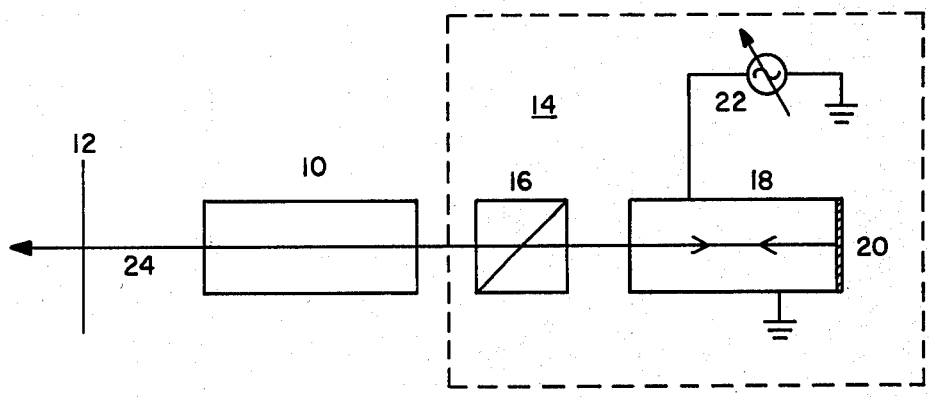

ACOUSTO-OPTICALLY TUNED LASER

BACKGROUND OF THE INVENTION

The broad band laser emission observed from organic dye lasers provides for a source of continuously tunable coherent radiation. Tuning of a dye laser was first accomplished in 1967 by Soffer and McFarland by replacing the back reflector of the optical resonant cavity with a rotatable diffraction grating. Since that time, other organic dye laser tuning techniques for producing narrow-band laser emission have been devised, most of which have been mechanical or electromechanical in design.

The disadvantages in using any tuning system that has moving parts, such as a rotatable diffraction grating or electro-mechanical devices, is the limited wavelength scan rate. The present invention is a tuning system having no moving parts. That is, tuning is accomplished by employing stationary components, which are a polarizer and a retroreflective, acousto-optic, electronically tunable filter (RETF). Laser beam diffraction is responsive to the radio frequency or frequencies (RF) applied to the RETF, and the RF "white noise" intentionally provided with a "notch" therein. The laser cavity maintains a high Q for only the wavelength corresponding to the notch. Thereby, we have notch scanning by laser wavelength.

Prior work has been done on electrically tunable filters by such as messieurs Taylor, Harris and Nich and Hansch, whose findings were reported in Applied Physics Letters, Volume 19, No. 8, of 15 Oct. 1971, under the title "Electronic Tuning of a Dye Laser Using the Acousto-Optic Filter." The work described therein contributes to the foundation of knowledge upon which the present invention rests. Tuning was achieved therein by applying an RF signal to an acousto-optic filter utilizing a collinear interaction between an ordinary optical wave, an extra-ordinary optical wave, and a travelling acoustical wave in a birefringent crystal. The optical frequency to which the laser is tuned corresponds to the single acoustic frequency applied to the crystal. Only the corresponding optical frequency undergoes a 90° polarizing rotation to be provided as the output. All other optical frequencies are effectively blocked. That is, the RF frequency applied causes the corresponding optical frequency to undergo a 90° polarization rotation, which polarized frequency is the one transmitted by the filter and provided as the tuned output of the laser. All other frequencies are not related and are therefore, blocked by the filter.

BRIEF DESCRIPTION OF THE DRAWING

The FIGURE is a plan view of the preferred embodiment of the present invention.

DESCRIPTION OF THE PREFERRED EMBODIMENT

The FIGURE shows a preferred embodiment of the present invention in plan form. Included are laser medium 10 which may be any tunable laser material, partially reflective output mirror 12, and laser tuning member 14. Material 10 may be excited by employment of a flash lamp, another laser or any other means of obtaining sufficient population inversion in the material to realize laser action. Mirror 12 is the output mirror of the laser system and will transmit a portion of the intracavity laser energy over the range through which the system can be tuned. The mirror's reflectivity must be determined experimentally for the components used and the desired output.

Tuning member 14 comprises polarizer 16 and electronically tunable filter 18 having substantially 100% reflective surface 20 and being responsive to radio frequency (RF) source 22.

The physical structure of retroreflective electronically tunable filter (RETF) 18 may be of the general type shown by Taylor et al., except in the present invention a substantial 100% reflective member (20) is fixedly attached as part of the rear surface thereof. In operation the two systems differ even more significantly. In the prior art, discussed above, a single RF frequency is coupled to the filter for transmitting that wavelength which corresponds to the frequency applied. In the present invention, white RF noise having a frequency "notch" is applied to block all wavelengths by polarization except the wavelength corresponding to the frequency of the "notch."

The present invention operates as follows:

Laser material 10 is excited to generate optical frequency emission. Partially reflective output mirror 12 bounds one end of the laser resonant cavity and provides sufficient reflectivity of the emitted wavelengths to maintain oscillation. With no RF power delivered to RETF 18 by source 22, the Q of the laser optical cavity is high for all wavelengths, and broadband laser emission is observed at the output. Oscillating emission 24 undergoes a 90° polarization rotation in polarizer 16, is reflected by surface 20, and is again polarized as it is transmitted by polarizer 16. The result is a high Q cavity over a broadband with an output provided by mirror 12. If a multiline laser source were used, several laser lines would appear.

Now, if white RF noise is applied to the RETF, all corresponding optical wavelengths would undergo a 90° rotation of polarization. Thus, the laser cavity will have a very low Q for these wavelengths. Emission 24 will now be subjected to an odd number of orthogonal polarizational rotations. Thus, there can be no laser action over the band of the dye. But, if a narrow tunable notch is placed in the white noise, laser action can occur at the optical wavelength corresponding to the RF notch. Thus, by tuning the RF notch, the wavelength of the laser is tuned.

Therefor, in the present invention white RF noise, with a frequency notch adjustably included therein by source 22, is impressed on filter 18. The frequency at which the notch occurs is controllably variable. All frequencies of emission 24 are subjected to an odd number of orthogonal polarizational rotations except the optical frequency corresponding to the notch. It is transmitted by filter 18 and reflected by surface 20 without polarization. Therefor, it is subjected to an even number of orthogonal polarizational rotations, all of which occur in polarizer 16. As a result, it is provided as the tuned output. Filter 18 is passive for the lasing wavelength corresponding to the notch with minimum and maximum output power.

The present invention uses white RF noise to block all unwanted frequencies, saving a single or narrow band of frequencies that may be varied to provide the controlled or tuned output.

Prior systems in the same area of technology require at least three air spaces within the resonant cavity whereas the present invention requires only two. As a result, the present invention provides for two less interfaces and can have a shorter laser cavity with a larger filling factor yielding a higher output energy, all because white RF noise is employed, and is employed to block undesired wavelengths. Even though the required RF power will probably be higher than that required for some other systems, the tuning members transmissivity at the notch has an inverse dependence upon the RF power, and for an ideal notch, the notch transmissivity is RF power independent. Therefore, cavity losses at the laser emission wavelength can be minimized by the present invention.

To those skilled in the art it will be obvious upon a study of this disclosure that the present invention permits a variety of modifications in structure and arrangement and hence can be given embodiments other than particularly described herein without departing from the essential features of the invention within the scope of the claims annexed hereto.

What is claimed is:

1. An acousto-optical laser tuning system comprising:
 a laser cavity including a lasing cell and beam of laser emission, bounded by fixed reflecting means at one end for substantially totally reflecting the optical wavelengths of interest that are incident thereon and a laser output mirror at the opposite end providing the output of said system;
 intracavity means for tuning said laser, including means for subjecting wavelengths of said beam to a selectable number of rotations of polarization, including fixed first means for polarizing said beam one increment of rotation per pass, second polarizing means for polarizing said beam one increment of rotation per pass in response to an electrical signal that includes an electronically tuneable filter, wherein said fixed reflecting means is attached to an end of said filter and is retroreflective such that the wavelengths transmitted by said filter are reflected by said retroreflective means, and further includes an electrical source coupled to said filter that provides a signal of radio frequency white noise to said filter, such that all optical wavelengths corresponding to said signal of white noise that are transmitted by said filter undergo a 90° rotation of polarization, and means for selectively interrupting polarization by said second means, such that the beam wavelength to which the system is tuned corresponds to said interruption, whereby laser oscillation is maintained during said interruption at the wavelength corresponding to said interruption; wherein the wavelength to which the system is tuned is subjected to fewer rotations of polarization than other wavelengths of said beam, such that the wavelength to which the system is tuned is provided in said system output.

2. The system of claim 1 wherein said interrupting means is a means for selectively interrupting said RF white noise signal to said filter such that the optical wavelengths corresponding to the wavelengths interrupted are transmitted by said filter without rotation of polarization, whereby said laser is tuned by selecting the radio frequency wavelength interrupted.

* * * * *